(12) United States Patent
Aksyuk et al.

(10) Patent No.: US 6,944,366 B2
(45) Date of Patent: Sep. 13, 2005

(54) PLANAR LIGHTWAVE WAVELENGTH DEVICE USING MOVEABLE MIRRORS

(75) Inventors: Vladimir Anatolyevich Aksyuk, Piscataway, NJ (US); Christopher Richard Doerr, Middletown, NJ (US); Dan T. Fuchs, Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/916,933

(22) Filed: Aug. 12, 2004

(65) Prior Publication Data

US 2005/0018957 A1 Jan. 27, 2005

Related U.S. Application Data

(63) Continuation of application No. 10/081,498, filed on Feb. 22, 2002, now abandoned.

(51) Int. Cl.[7] .............................. G02B 6/35; G02F 1/01
(52) U.S. Cl. ............................... 385/18; 385/1; 385/47; 385/140
(58) Field of Search .......................... 385/1–10, 16–24, 385/47, 140

(56) References Cited

U.S. PATENT DOCUMENTS

| 4,904,042 | A | | 2/1990 | Dragone |
| 5,949,571 | A | | 9/1999 | Goossen et al. |
| 5,974,207 | A | | 10/1999 | Aksyuk et al. |
| 6,049,640 | A | | 4/2000 | Doerr |
| 2003/0095777 | A1 | * | 5/2003 | Janssen ..................... 385/140 |

\* cited by examiner

*Primary Examiner*—Michelle R. Connelly-Cushwa

(57) ABSTRACT

A method and apparatus are disclosed for adjusting the phase of an optical signal by varying the path length of the optical signal using one or more moveable mirrors. The phase adjustment techniques of the present invention may be employed in various optical devices, including 1×n optical switches. The position of the mirrors may be controlled, for example, using micromachined control elements that physically move the mirror along the lightpath. An exemplary 2-by-2 optical switch includes two waveguides configured to include a coupler region. A mirror is positioned at the output of each waveguide. The position of at least one of the mirrors may be adjusted along the optical path and the mirrors reflect the light exiting from the end of the waveguides back into the same waveguide after an adjustable phase delay due to the round trip through an adjustable air gap between the waveguides and corresponding mirrors.

10 Claims, 7 Drawing Sheets

PLANAR LIGHTWAVE WAVELENGTH DEVICE USING MOVEABLE MIRRORS

CROSS-REFERENCE TO RELATED APPLICATIONS

The present application is a continuation application of U.S. patent application Ser. No. 10/081,498 filed Feb. 22, 2002, now abandoned.

FIELD OF THE INVENTION

The present invention relates to mechanisms for manipulating light in optical circuits and in waveguide chips and, more particularly, to optical devices for routing multi-wavelength optical signals.

BACKGROUND OF THE INVENTION

Many innovations for optical communication systems have involved the manner in which light waves are switched and manipulated. In many optical transmission applications, it is necessary to perform one or more of the following actions on light: switching, attenuation, routing to different locations or manipulating the phase of light. Such actions are critical for realization of the optical networks that are the foundation of global communications systems.

Optical communication systems increasingly employ wavelength division multiplexing (WDM) techniques to transmit multiple information signals on the same fiber, and differentiate each user sub-channel by modulating a unique wavelength of light. WDM techniques are being used to meet the increasing demands for improved speed and bandwidth in optical transmission applications. In optical communication networks, such as those employing WDM techniques, individual optical signals are often selectively routed to different destinations. Thus, a high capacity matrix or cross-connect switch is often employed to selectively route signals through interconnected nodes in a communication network.

At the heart of these cross-connect switches is the single switching unit. Single switching units should exhibit low manufacturing and operation costs, small losses of the optical signal when passing through the switch (low insertion loss), and high blocking of unwanted signals (high extinction ratio). Many switches used in optical communication networks are manual, and are relatively cheap to manufacture, but expensive to operate. In addition, available switches tend to prevent high switching speed and flexibility. Electronic switches first convert the optical signal into an electronic signal, perform the switching and then convert back into optical signals. These conversions are very expensive and the switches are complex to manage but allow considerable flexibility. As networks grow and become dense, however, electronic switches become increasingly expensive and harder to fabricate.

Therefore, optical switches that operate directly on the light wave are favorable. Optical switches are often realized in optical waveguides that can be manufactured with low cost and enable easy multiplexing and de-multiplexing of the WDM signal using waveguide grating routers (WGR). For a detailed discussion of waveguide grating routers, such as optical star couplers, see U.S. Pat. No. 4,904,042 to Dragone. Switching in waveguides is often accomplished by applying phase or amplitude changes using an electrooptic effect or a thermooptic effect. The electrooptic effect usually requires special and expensive waveguide materials, such as InP or LiNbO$_3$, that exhibit nonlinear effects and are used for fast switching and specialized applications. Thermooptic switching (a heat induced change in the index of refraction) in waveguides is robust and is extensively used in combination with WGR in optical waveguide circuits. However, thermooptic switches suffer from high power consumption and limit the complexity of circuits that can be built due to thermal crosstalk and maximum power limitations.

Recently, micro electro mechanical systems (MEMS) switches have been introduced for network applications. MEMS switches are usually movable mirrors that change the propagation direction of light, or block light. For a discussion of a wavelength-selective add-drop multiplexer that uses movable mirrors to add and/or drop spectral components from a wavelength-division-multiplexed optical signal, see, for example, U.S. Pat. No. 5,974,207 to Aksyuk et al, assigned to the assignee of the present invention and incorporated by reference herein. To change the propagation direction of the light, or block the light, a shutter must be moved a distance long enough to move the shutter in and out of a light beam or tilt the shutter with an angle larger than the angular width of the optical beam. These displacements are usually challenging to make with MEMS actuators that excel at microscopic motion. If switching can be achieved by motion that is the size of the optical wavelength (about 1–2 $\mu$m for common communications systems), MEMS switches could be implemented in waveguides and other systems.

SUMMARY OF THE INVENTION

Generally, a method and apparatus are disclosed for adjusting the phase of an optical signal by varying the path length of the optical signal using one or more moveable mirrors. The phase adjustment techniques of the present invention may be employed in various optical devices, including 1×n optical switches that introduce a phase change and recombine the optical signal to switch a received optical signal to a desired output port. This phase changing method can also be employed for pulse-shaping applications, where phase changes of the different spectral components of a wave are phase delayed in different amounts, as well as for dispersion compensation devices, polarization manipulation devices, and other apparatuses where a phase change is required.

In an exemplary 2-by-2 optical switch, two waveguides configured to include a coupler region carry light signals in both directions. A mirror is positioned at the output of each waveguide. The position of at least one of the mirrors may be adjusted along the optical path and the mirrors reflect the light exiting from the end of the waveguides back into the same waveguide after an adjustable phase delay due to the round trip optical path through an adjustable air gap between the waveguides and corresponding mirrors. A received optical signal is split in the coupler region into two generally equal components. Thereafter, the phase of at least one component of the optical signal is adjusted in accordance with the present invention, by controlling the relative position of the mirrors to introduce a phase change. The optical signal components are then recombined in the coupler region to accomplish constructive or destructive interference, based on the introduced phase change. In this manner, the optical signal appears at the desired output port.

The position of the mirrors may be controlled, for example, using micromachined control elements that physically move the mirror along the light path. The present invention may also be applied in wavelength selective optical switches that support multiple optical channels. A number of techniques are disclosed for fabricating optical devices in accordance with the present invention.

The present invention thus combines phase-senstivite waveguide structures with micromachined actuators that move small amounts to realize a switch. The present invention can be used for any light switching application, in addition to the exemplary communications applications, as would be apparent to a person of ordinary skill in the art. For example, the present invention can be applied to make an add-drop multiplexer (ADM). An ADM is often needed in an optical network when it is desirable to remove (drop) light of a given wavelength from a fiber or add light of a given wavelength to the fiber.

A more complete understanding of the present invention, as well as further features and advantages of the present invention, will be obtained by reference to the following detailed description and drawings.

DETAILED DESCRIPTION

Figure 1:
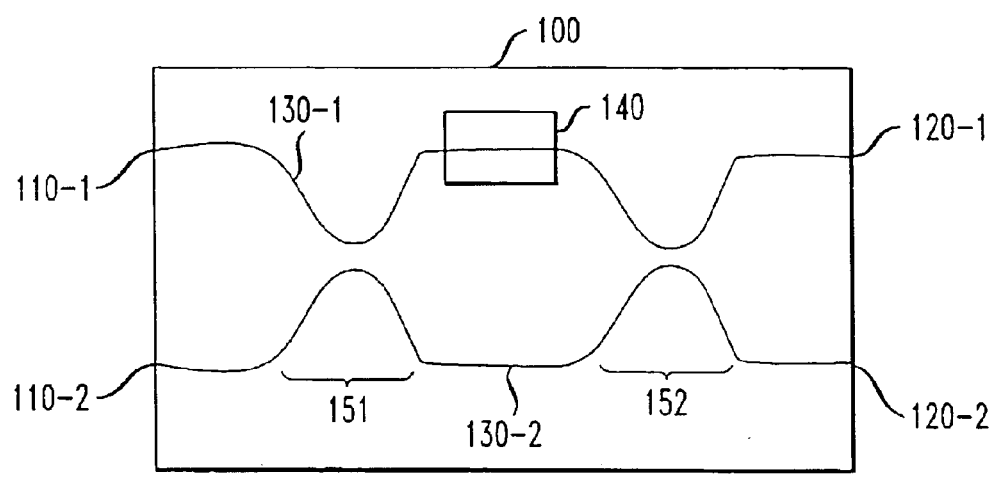
FIG. 1 illustrates an exemplary conventional (prior art) 2-by-2 Mach-Zhender interferometer optical switch.

FIG. 1 illustrates an exemplary conventional 2-by-2 Mach-Zhender interferometer optical switch 100 having two input ports 110-1, 110-2 and two output ports 120-1, 120-2, two 3 dB couplers 151 and 152, and at least one thermooptic phase shifter 140. Generally, the optical switch 100 accepts an incoming signal at an input port 110-1 or 110-2 and selectively passes the optical signal to one of the output ports 120-1 or 120-2. (For a discussion of Mach Zhender interferometers, see, for example, Katsunari Okamoto, "Fundamentals of Optical Waveguides," p. 159, Academic Press (2000)).

Generally, the optical switch 100 accepts an incoming signal of multiple wavelength channels at an input port 110-1 or 110-2, which is then split into two equal parts in waveguides 130-1 and 130-2 at the 3 dB coupler 151. The phase of the signal in waveguide 130-1 can be changed, affecting the way in which the signals interfere when recombined at the second coupler 152 to selectively pass the optical signal to one of the output ports 120-1 or 120-2 or divide the intensity between them. Typically, the phase change is achieved by the thermooptic effect with heater 140 by varying the temperature of the waveguide 130-1 in which the optical signal travels. It has been found, however, that the necessary temperature change requires significant power consumption and significant cross-talk between nearby switches on the same chip limiting the amount of switches that can be put on one chip and the complexity of a switch system that can built.

Figure 2:
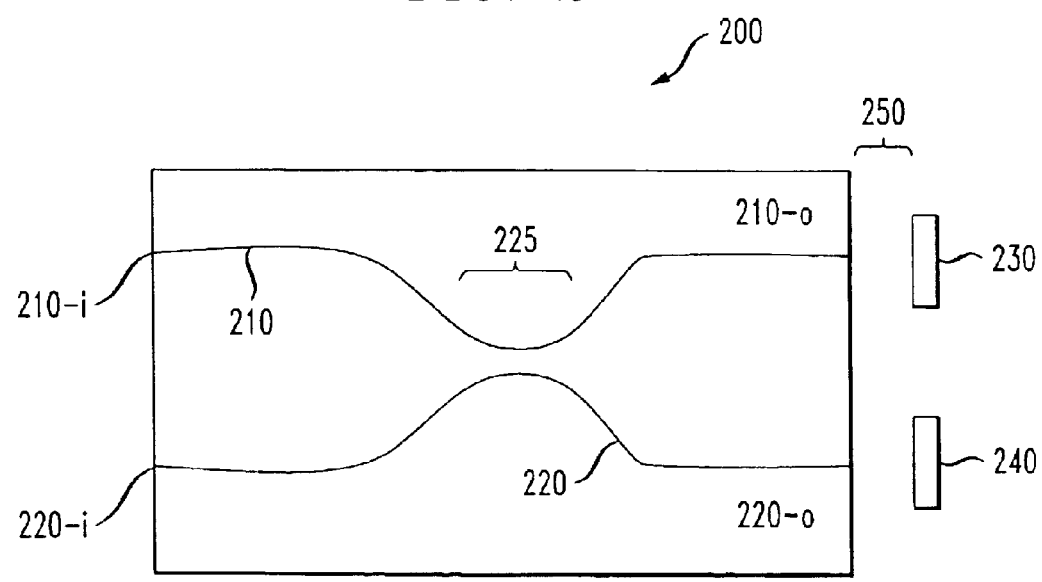
FIG. 2 illustrates an exemplary 2-by-2 optical switch in accordance with the present invention.

According to one feature of the present invention, a phase change is achieved in an optical signal by varying the optical path length of the signal using one or more moveable mirrors. FIG. 2 illustrates an exemplary 2-by-2 optical switch 200 in accordance with the present invention. As shown in FIG. 2, the optical switch 200 has two waveguides 210 and 220, each carrying light in both directions. The two waveguides 210 and 220 are configured to include a coupler region 225, in a known manner. As discussed hereinafter, the optical switch 200 is configured in a reflective mode (this also helps in reducing by a factor of 2, the necessary chip area needed for the switch). Thus, an input to a single waveguide, such as the input 210-i (or 220-i) to the waveguide 210 (or 220), is both an input port and an output port of the optical switch 200.

As shown in FIG. 2, mirrors 230, 240 are positioned at the output of each waveguide 210, and 220. The position of at least one of the mirrors 230, 240 may be adjusted along the optical path. The mirrors 230, 240 reflect the light exiting from the end of the waveguides back into the waveguides 210, 220 after an adjustable phase delay due to the round trip through the adjustable air gap 250 between the waveguides 210, 220 and mirrors 230, 240, respectively. It is noted that the gap 250 can also be filled with index matching material to get more efficient coupling in and out of the waveguides. However, diffraction losses can be minimized by reducing the gap 250 to a necessary minimum.

Generally, an optical signal applied to the input of a single waveguide, such as the input 210-i to the waveguide 210, is split in the coupler region 225 into two generally equal components. Thereafter, in accordance with the present invention, the phase of at least one component of the optical signal is adjusted, as desired, by controlling the relative position of the mirrors 230, 240 to introduce a relative phase change in the reflected light. The optical components are then recombined in the coupler region 225 to accomplish constructive or destructive interference, based on the introduced phase change. In this manner, the optical signal appears at the appropriate output port of the optical switch 200.

Figure 3:
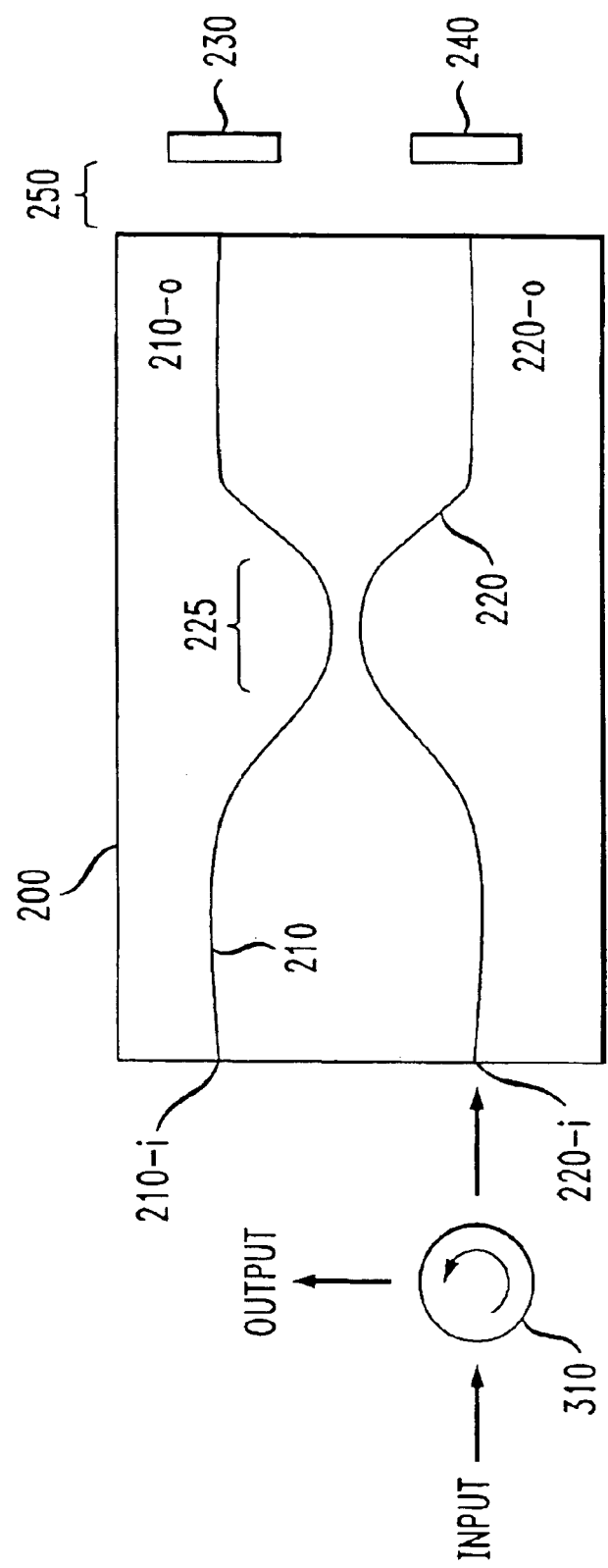
FIG. 3 illustrates an optical switch that includes the optical switch of FIG. 2 and at least one optical circulator to separate incoming and outgoing light.

As previously indicated, each waveguide 210 and 220 in the optical switch 200 of FIG. 2 potentially carries light in both directions. FIG. 3 illustrates an optical switch 300 that includes the optical switch 200 of FIG. 2 and at least one optical circulator 310 that separates incoming and outgoing light, in a known manner. The exemplary optical switch 300 includes one optical circulator 310 connected to the bottom waveguide 220 of the optical switch 200. In this manner, the optical circulator 310 allows bi-directional communication on the waveguide 220.

Figure 4:
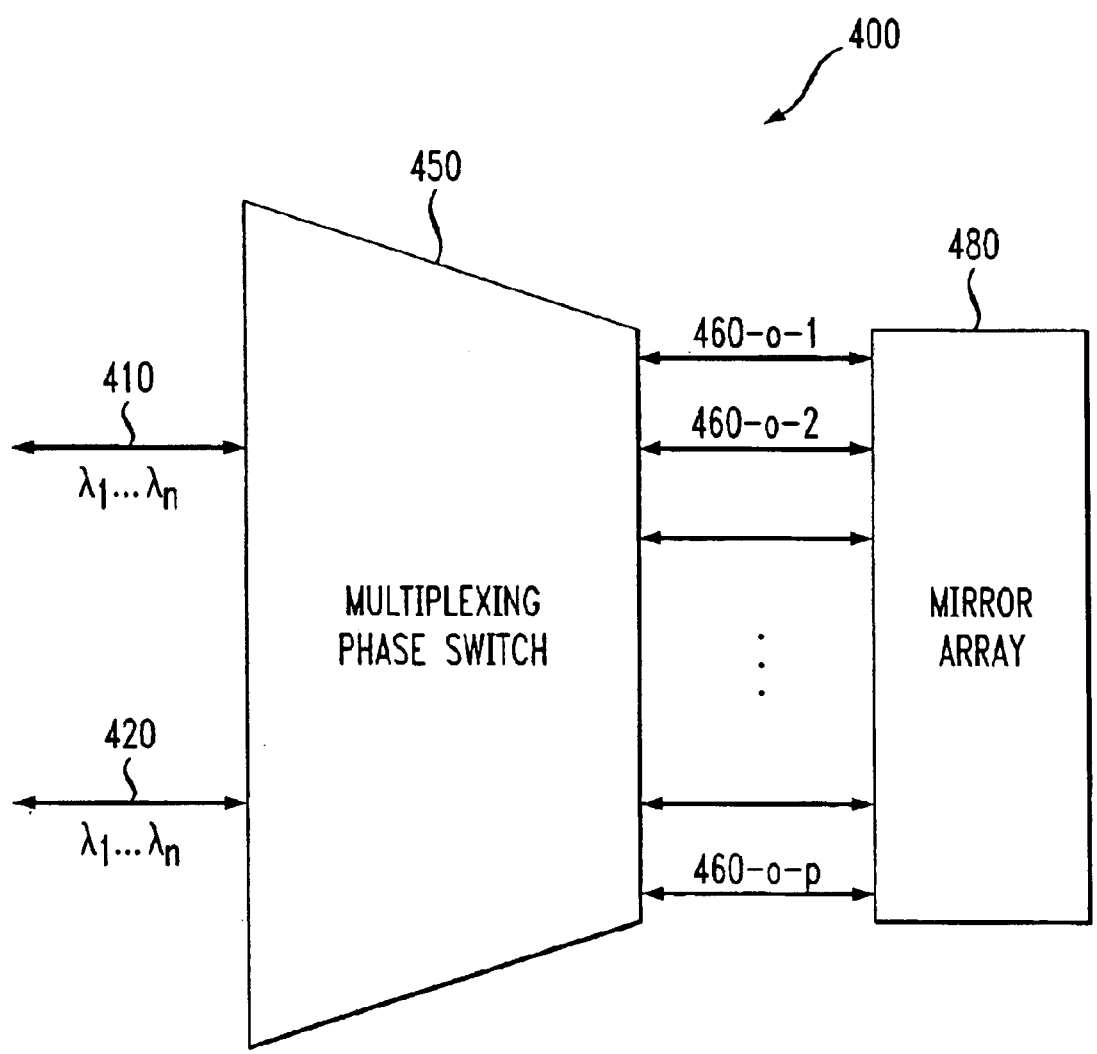
FIG. 4 illustrates a block diagram of 2-by-2 wavelength selective optical switch in accordance with the present invention that supports n optical channels.

FIG. 4 illustrates a 2-by-2 wavelength selective switch 400 that supports n optical channels. As shown in FIG. 4, the optical switch 400 includes two bi-directional waveguides 410, 420, a multiplexing phase switch 450 and a mirror array 480 having p mirrors. Input light from waveguides 410 or 420 is separated into the different intermediate parts 460-o-1 to 460-o-p (usually in waveguides) by the multiplexing phase switch 450, this light impinges on the mirror array 480 and is reflected back into the multiplexing phase switch 450 that channels the signal to the waveguides 410 or 420. The phase of one or more of the n optical channels is adjusted by varying the position of one or more mirrors in the mirror array 480. In this manner, each of the different component wavelengths can be selectively switched to either waveguide 410, 420. One embodiment of the multiplexing phase switch 450 is discussed below in conjunction with FIG. 5.

Figure 5:
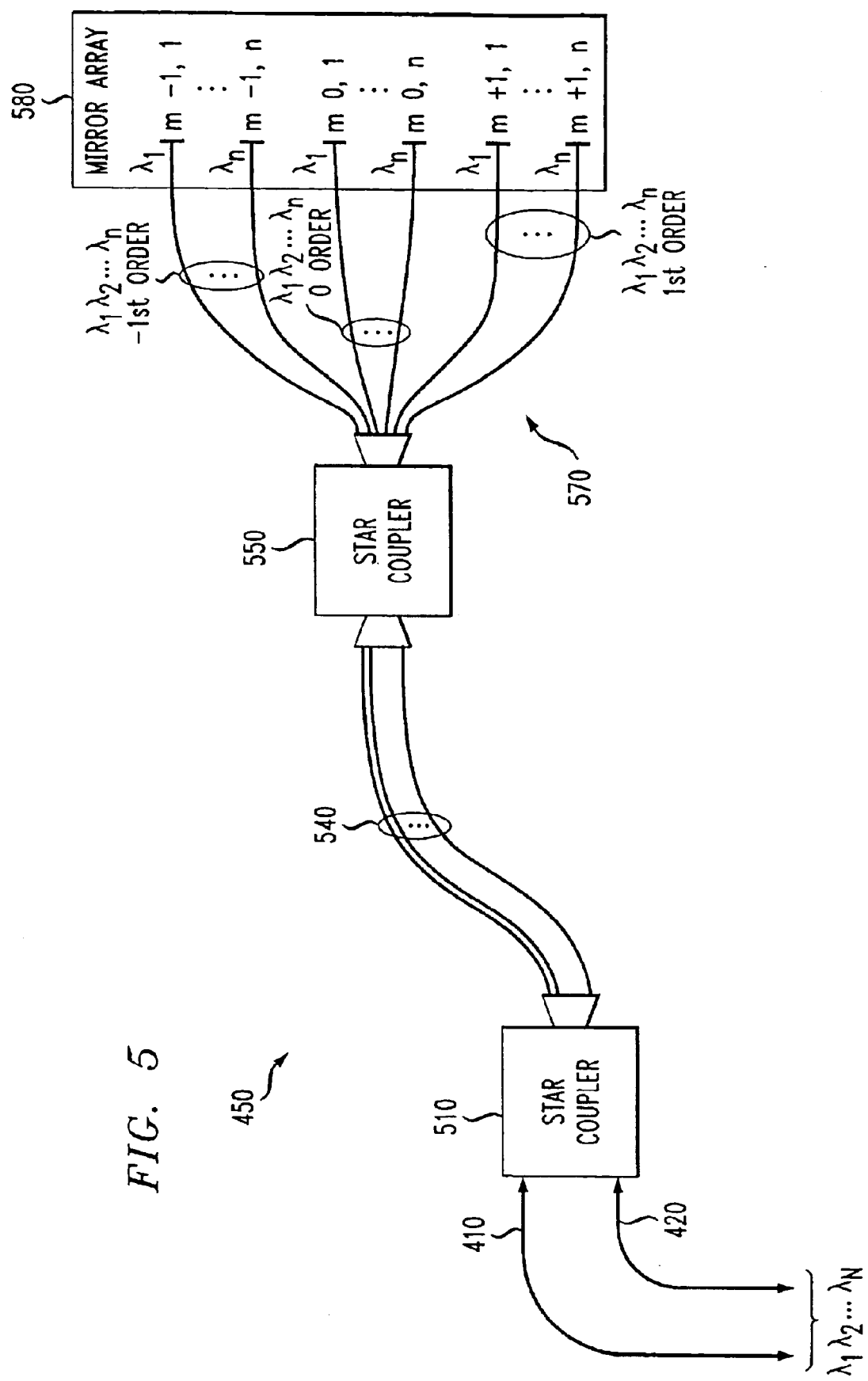
FIG. 5 illustrates an exemplary implementation of the wavelength selective switch of FIG. 4.

FIG. 5 illustrates an exemplary implementation of the multiplexing phase switch 450 of FIG. 4. As previously indicated, the present invention achieves switching using the destructive interference of two optical components of the same optical signal. However, in order to get good extinction ratio the intensity splitting has to be very accurate usually barred by manufacturing tolerances. Thus, it is known to employ three or more copies (orders) of the same optical signal to cancel the optical signal, removing the limitations due to manufacturing difficulties. As shown in FIG. 5, the multiplexing phase switch 450 includes a first star coupler 510, an array of waveguides 540 and a second star coupler 550.

The first star coupler 510 splits the incoming signals into different similar parts. The waveguide array 540 includes n waveguides with different lengths to enable the multiplexing at the second star coupler. A second star coupler 550 focuses each of the n channels and creates m copies (orders) of each channel. Thus, at the output of the second star coupler 550, there are m copies of each of the n channels. Thus, the waveguide array 570 includes m×n independent waveguides and the mirror array 580 has m×n mirrors. In one implementation, there are 3 copies of each of the n channels (m=3) to provide $+1^{st}$ order, 0 order and $-1^{st\ 1}$ order copies of each channel. In one exemplary implementation, the 0 order copy of the optical signal includes 40% of the optical intensity while the $+1^{st}$ order and $-1^{st}$ order copies of each channel have 30% of the optical intensity (this ratio varies between channels). The phase of each of the m copies of the n channels is adjusted independently in accordance with the present invention by varying the position of the corresponding mirror in the mirror array 580. This is fully described in U.S. Pat. No. 6,049,640 to Doerr, entitled "Wavelength-Division-Multiplexing Cross-Connect Using Angular Dispersive Elements and Phase Shifters," incorporated by reference herein.

Figure 6:
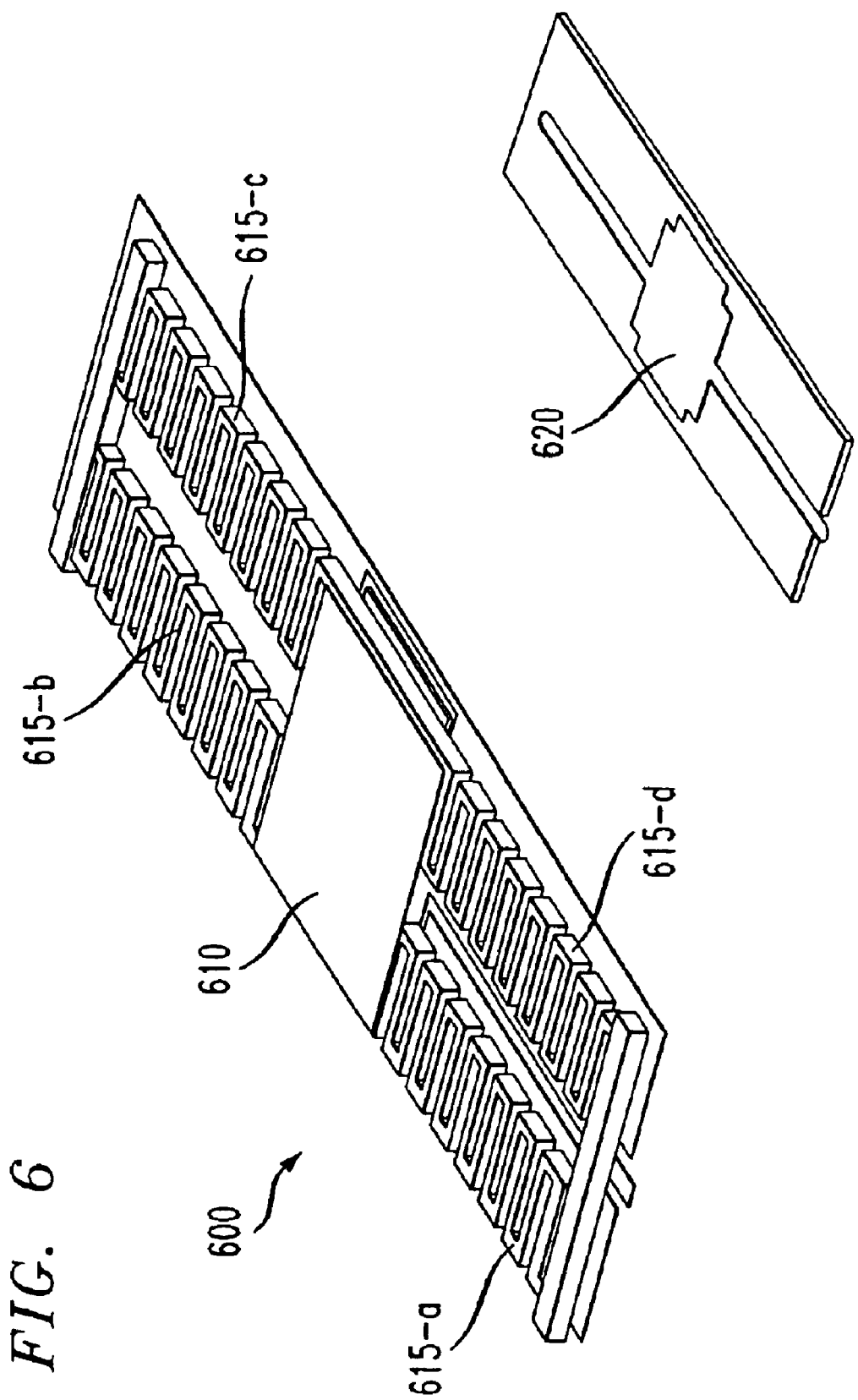
FIG. 6 is a schematic diagram of a micro electromechanical systems (MEMS) mirror that may be fabricated using silicon technologies in accordance with one embodiment of the present invention.

FIG. 6 is a schematic diagram of a micro electromechanical systems (MEMS) mirror assembly 600 that may be fabricated using silicon technologies in accordance with one embodiment of the present invention. As shown in FIG. 6, the mirror assembly 600 includes a reflective portion 610 that is held in position using four silicon springs 615-a, b, c, d, and is kept at ground potential. A voltage V is applied to an electrode 620 underneath the mirror to move the mirror closer to the electrode. Fabrication is done, for example, using a three layer polysilicon surface micromachining process similar to the one discussed in D. Keoster et al., "Multiuser MEMS Processes (MUMPS) Introduction and Design Rules," Rev. 4, MCNC MEMS Technology Applications Center, Research Triangle Park, N.C. 27709 (Jul. 15, 1996), incorporated by reference herein.

An electrically-controlled movable mirror capable of accomplishing similar function may have different design and may be fabricated by a variety of different micromachining techniques. For example, a suitably reflective suspended movable electrostatically-controlled membrane can be used instead of a reflective plate suspended on microfabricated springs, as described in U.S. Pat. No. 5,949,571, entitled "Mars Optical Modulators, incorporated by reference herein.

As described in the previous paragraph, the moving mirror manufacturing is by a process separate from the waveguide manufacturing process. This enables the flexibility to optimize both processes for the waveguide manufacturing and mirror array manufacturing and use existing well-proven manufacturing processes at the expense of having to integrate the two chips later. This is done by active alignment of the two pieces and attachment by an adhesive, solder or other similar technique. However, as discussed below in conjunction with FIGS. 7A and 7B, an embodiment of the invention is presented where the MEMS mirrors are manufactured on the waveguide chip enabling a monolithic switch.

Figure 7A:
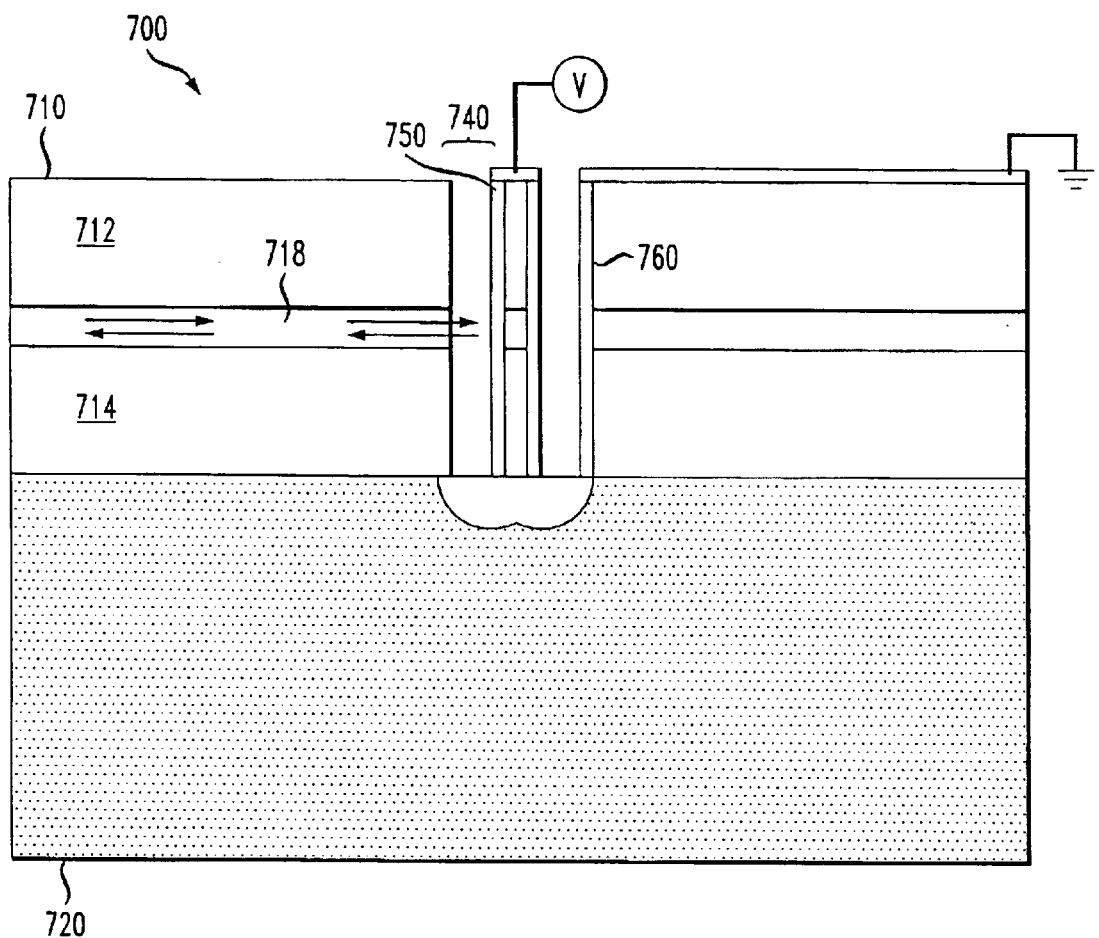
FIG. 7A is a side view of an embodiment of a monolithic optical switch in accordance with the present invention.

FIG. 7A is a side view of an embodiment of a monolithic optical switch 700 in accordance with the present invention. As shown in FIG. 7A, the optical switch 700 is fabricated in the waveguide layer 710 on a substrate 720. The waveguide layer 710 is comprised on an upper and lower cladding 712, 714 and a higher index core glass 718 within which the light is guided. An exemplary process for fabricating the optical switch 700 is discussed further below in conjunction with FIG. 8.

The optical switch 700 includes a mirror 750 that may be embodied as a reflective material, such as gold, deposited on the cladding and core material. The position of the mirror 750 is varied by applying a voltage to the terminal, V, as shown in FIG. 7A. The mirror 750 is shown in FIG. 7A in a default position, with no voltage applied. As the applied voltage increases towards a maximum value, the mirror 750 moves to the right in the figure, towards the grounded electrode 760. As shown in FIG. 7A, the mirror 750 is positioned at the output of waveguide core 718 and may be adjusted along the optical path. The mirror 750 reflects the light exiting from the end of the waveguide 718 back into the waveguide 718 after an adjustable phase delay due to the round trip through the adjustable air gap 740 between the waveguide 718 and mirror 750. It is noted that the optical path of the light may expand in the air gap 740 therefore a minimal gap 740 is desired. Index matching fluid or beam shaping at the end of the waveguide can be used to relax this constraint.

Figure 7B:
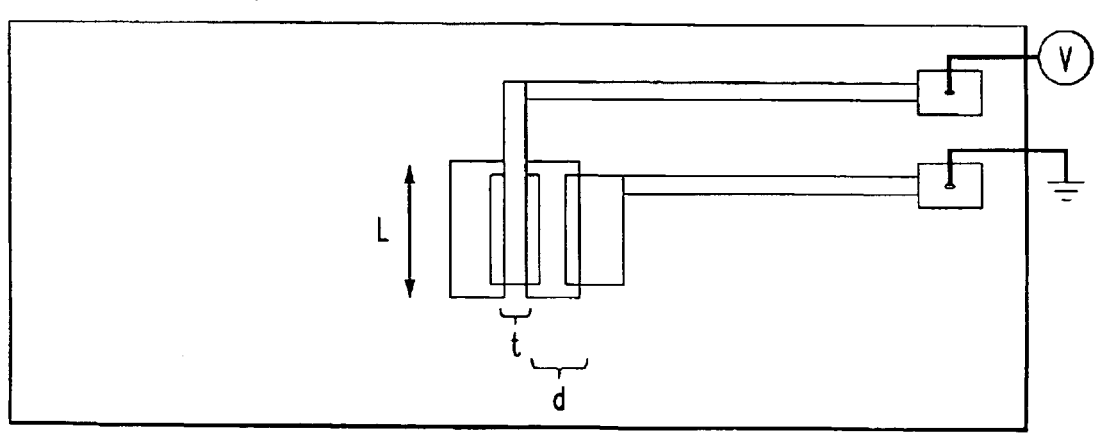
FIG. 7B is a top view of the embodiment of a monolithic optical switch fabricated in accordance with the present invention showing some of the design parameters.
Figure 8A:
FIGS. 8A through 8H, collectively, illustrate side and top views of an exemplary process for fabricating the optical switch of FIGS. 7A and 7B.
Figure 8B:
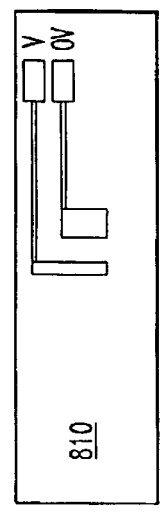
Figure 8C:
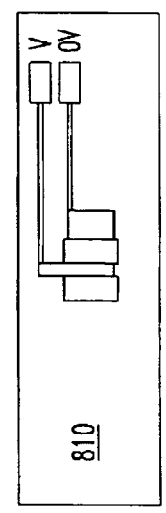
Figure 8D:
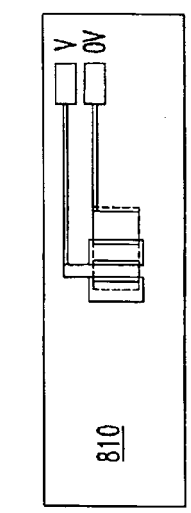

FIGS. 8A through 8H illustrate an exemplary process for fabricating the optical switch 700 of FIGS. 7A and B. As shown in FIGS. 8A (side view) and 8B (top view), the process is initiated with waveguides 810 having a lower and upper cladding and a higher index core glass, deposited on a substrate 820. Thereafter, as shown in FIGS. 8C (side view) and 8D (top view), metal is deposited on the waveguides 810 for the electrical connections (ground (0V) and V) discussed above in conjunction with FIGS. 7A and 7B.

Figure 8E:
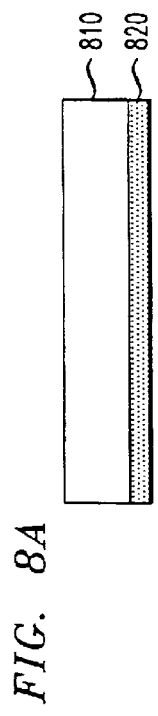
Figure 8F:
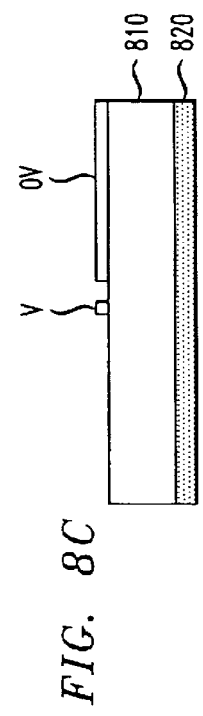
Figure 8G:
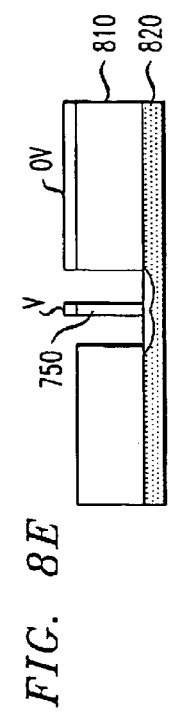
Figure 8H:
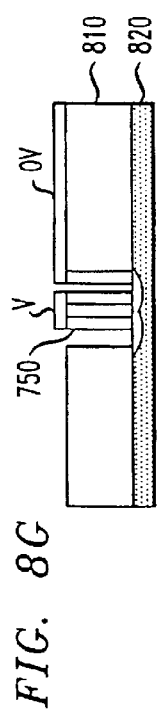

As shown in FIG. 8E (side view) and 8F (top view), two holes are then etched in the glass 810 to form the front and rear surfaces of the mirror 750. In addition, the substrate 820 is released, for example, by wet etching through the holes that were etched to remove portions of the substrate, to avoid a short on the bottom and allow movement of the mirror 750. Finally, as shown in FIG. 8G (side view) and 8H (top view), angular depositions are applied to the etched mirror to provide a reflective and electrode surfaces using shadow mask evaporation.

FIG. 7B illustrates a top view of an exemplary embodiment of an optical switch 700 fabricated in accordance with the present invention. It is generally desired to be able to move the mirror a distance of $$\frac{\lambda}{2}$$

(for a round trip phase shift of $2\pi$). Thus, for typical wavelengths of 1.5 µm, it is generally desired to be able to move the mirror a distance of larger than 0.75 µm. Mirror movement of 1.9 µm is obtained in an exemplary implementation where the membrane length, L, is $2\times10^{-4}$ m, the membrane thickness, t, is $2\times10^{-6}$ m, the trench width (electrode spacing), d, is $2\times10^{-6}$ m and the maximum applied voltage, V, is 100V. In this embodiment, the maximum distance, Y, that a mirror can be moved is obtained from the approximate formula as follows:

$$Y \cong \frac{1}{64} \cdot \frac{\varepsilon}{E} \cdot \frac{L^4 \cdot V^2}{t^3 \cdot d^2} \cong 1.2 \text{ µm},$$

where $\varepsilon \cong 8.85 \times 10^{-12}$ F/m is the dielectric constant of air and $E \cong 73$ GPa is Young's modulus (a property of the silica glass).

It is to be understood that the embodiments and variations shown and described herein are merely illustrative of the principles of this invention and that various modifications may be implemented by those skilled in the art without departing from the scope and spirit of the invention. For example, in one variation, the mirror can be positioned at a variable angle so that the light returned to the waveguide can be attenuated by a desired amount by deflecting a certain portion of the light so that it is not captured by the waveguide. Also the actuation mechanism of the mirror may be changed to thermal actuation, magnetic actuation or other by modification of the mirror actuators 700 or 600 accordingly. Another variation can change the nature of the waveguide to be manufactured from different materials like polymers. Another variation may include partially reflecting mirrors enabling Fabry-Perot like interferometers.

What is claimed is:

1. An optical switch, comprising:
   means for receiving an optical signal;
   means for splitting said optical signal into at least two optical components, wherein two or more of said at least two optical components have the same spectral content;
   a moveable mirror for adjusting a phase of at least one of said optical components by adjusting a position of said mirror along a first path of said optical component, wherein said moveable mirror reflects said at least one of said optical components substantially into said first path of said optical component; and
   means for recombining said at least two optical components to accomplish constructive or destructive interference.

2. The optical switch of claim 1, wherein said means for receiving comprises at least one waveguide for carrying said optical signal.

3. The optical switch of claim 1, wherein said means for splitting and recombining said optical signals is a coupler region between two adjacent waveguides, a star coupler, an arrayed waveguide router or a multimode interference waveguide.

4. The optical switch of claim 1, wherein said mirror is controlled by a micromachine control element that positions said mirror in a desired position along an optical path.

5. The optical device of claim 1, wherein said mirror is positioned at an end of said at least one waveguide.

6. The optical device of claim 1, wherein said mirror is fabricated from waveguide material deposited on a substrate.

7. The optical device of claim 1, wherein said optical signal is a wavelength-division multiplexed signal comprising N wavelength channels and wherein said optical switch further comprises a demultiplexer for producing a plurality of demultiplexed output signals from said input WDM signal and at least one mirror associated with each of said N wavelength channels.

8. A method for switching an optical signal, said method comprising the steps of:
   receiving said optical signal;
   splitting said optical signal into at least two optical components, wherein two or more of said at least two optical components have the same spectral content;
   adjusting a phase of at least one of said optical components by adjusting a position of a mirror along a first path of said optical component, wherein said mirror reflects said at least one of said optical components substantially into said first path of said optical component; and
   recombining said at least two optical components to accomplish constructive or destructive interference.

9. The method according to claim 8, wherein said adjusting step is performed by a micromachine control element that positions said mirror in a desired position along an optical path.

10. The method according to claim 8, wherein said optical signal is a wavelength-division multiplexed signal comprising N wavelength channels and wherein said method further comprises the step of demultiplexing said optical signal to produce a plurality of demultiplexed output signals from said input WDM signal.

* * * * *

UNITED STATES PATENT AND TRADEMARK OFFICE
CERTIFICATE OF CORRECTION

PATENT NO. : 6,944,366 B2
APPLICATION NO. : 10/916933
DATED : September 13, 2005
INVENTOR(S) : Aksyuk et al.

It is certified that error appears in the above-identified patent and that said Letters Patent is hereby corrected as shown below:

Title page, "References Cited" (Item 56) insert the following 2 U.S. Patent Documents:

-- 6,304,709  B1    10/2001    Fujita, Masayuki --
    -- 2003/0058520  A1    3/2003    Yu et al. --.

Signed and Sealed this

Twenty-eighth Day of November, 2006

JON W. DUDAS
*Director of the United States Patent and Trademark Office*

UNITED STATES PATENT AND TRADEMARK OFFICE
CERTIFICATE OF CORRECTION

PATENT NO. : 6,944,366 B2  Page 1 of 1
APPLICATION NO. : 10/916933
DATED : September 13, 2005
INVENTOR(S) : Aksyuk et al.

It is certified that error appears in the above-identified patent and that said Letters Patent is hereby corrected as shown below:

In column 2, line 35, before "optical switches" and after "including" please change "1xn" to read as -- 1 x n --

In column 5, line 29, before "independent waveguides" and after "570 includes" please change "mxn" to read as -- m x n --.

In column 5, line 30, before "mirrors" and after "580 has" please change "mxn" to read as -- m x n --.

Signed and Sealed this

Twenty-sixth Day of June, 2007

JON W. DUDAS
*Director of the United States Patent and Trademark Office*